(12) United States Patent
Ahn

(10) Patent No.: US 12,367,551 B2
(45) Date of Patent: Jul. 22, 2025

(54) ELECTRONIC DEVICE AND OPERATION METHOD THEREOF

(71) Applicant: SAMSUNG ELECTRONICS CO., LTD., Suwon-si (KR)

(72) Inventor: Taegyoung Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 546 days.

(21) Appl. No.: 17/828,111

(22) Filed: May 31, 2022

(65) Prior Publication Data

US 2023/0045334 A1   Feb. 9, 2023

Related U.S. Application Data

(63) Continuation of application No. PCT/KR2022/006942, filed on May 13, 2022.

(30) Foreign Application Priority Data

Aug. 4, 2021   (KR) .................. 10-2021-0102661

(51) Int. Cl.
*G06T 5/20* (2006.01)
*G06T 3/4007* (2024.01)
(Continued)

(52) U.S. Cl.
CPC .............. *G06T 5/20* (2013.01); *G06T 3/4007* (2013.01); *G06T 3/4053* (2013.01); *G06T 5/70* (2024.01); *G06T 2207/20016* (2013.01)

(58) Field of Classification Search
CPC ....... G06T 5/20; G06T 3/4007; G06T 3/4053; G06T 5/70; G06T 2207/20016;
(Continued)

(56) References Cited

U.S. PATENT DOCUMENTS

| | | |
|---|---|---|
| 7,889,949 B2 | 2/2011 | Cohen et al. |
| 9,299,128 B2 | 3/2016 | Tian et al. |

(Continued)

FOREIGN PATENT DOCUMENTS

| | | |
|---|---|---|
| JP | 2013-30898 | 2/2013 |
| JP | 2013-120951 | 6/2013 |

(Continued)

OTHER PUBLICATIONS

International Search Report and Written Opinion dated Aug. 10, 2022 in International Patent Application No. PCT/KR2022/006942 (6 pages; 5 pages English Translation).

(Continued)

*Primary Examiner* — Akwasi M Sarpong
*Assistant Examiner* — Michael L Burleson
(74) *Attorney, Agent, or Firm* — STAAS & HALSEY LLP

(57) ABSTRACT

A method of an electronic device including obtaining a low-resolution input image by down-sampling a high-resolution input image; obtaining a low-resolution output image by performing image quality processing on the low-resolution input image; obtaining a low-resolution model from a conversion relationship between the low-resolution input image prior to the image quality processing being performed and the low-resolution output image subsequent to the image quality processing being performed; performing up-sampling of the low-resolution model; obtaining a high-resolution model by modifying the up-sampled low-resolution model, based on a difference between the high-resolution input image and the low-resolution input image; and obtaining a high-resolution output image from the high-resolution input image, by applying the high-resolution model to the high-resolution input image.

18 Claims, 11 Drawing Sheets

(51) Int. Cl.
*G06T 3/4053* (2024.01)
*G06T 5/70* (2024.01)

(58) Field of Classification Search
CPC ....... G06T 1/20; G06T 3/4092; H04N 7/0125; H04N 7/0102
See application file for complete search history.

(56) References Cited

U.S. PATENT DOCUMENTS

| | | | |
|---|---|---|---|
| 10,579,908 | B2 | 3/2020 | Chen et al. |
| 11,049,216 | B1 | 6/2021 | Chalfin et al. |
| 2012/0294512 | A1* | 11/2012 | Matsuda ............... G06T 3/4053 382/155 |
| 2013/0016920 | A1 | 1/2013 | Matsuda et al. |
| 2015/0309663 | A1* | 10/2015 | Seo ....................... G06F 3/0418 345/175 |
| 2018/0137603 | A1* | 5/2018 | Hsiao ........................ G06T 7/90 |
| 2018/0286323 | A1* | 10/2018 | Goodman ............ G02B 5/0278 |
| 2020/0257306 | A1* | 8/2020 | Nisenzon ................ G06V 20/56 |
| 2020/0311871 | A1 | 10/2020 | Yu et al. |
| 2021/0065337 | A1 | 3/2021 | Bai |
| 2021/0144357 | A1 | 5/2021 | Kim et al. |

FOREIGN PATENT DOCUMENTS

| | | |
|---|---|---|
| KR | 10-2013-0104410 | 9/2013 |
| KR | 10-2019-0118023 | 10/2019 |
| KR | 10-2020-0071866 A | 6/2020 |
| KR | 10-2164524 B1 | 10/2020 |
| KR | 10-2021-0056149 | 5/2021 |
| KR | 10-2021-0095054 | 7/2021 |

OTHER PUBLICATIONS

Extended European Search Report issued Sep. 17, 2024 for European Patent Application No. 22853236.2.

* cited by examiner

ELECTRONIC DEVICE AND OPERATION METHOD THEREOF

CROSS REFERENCE TO THE RELATED APPLICATION

This application is a continuation application, under 35 U.S.C. § 111(a), of International Application No. PCT/KR2022/006942, filed May 13, 2022, which claims priority to Korean patent application No. 10-2021-0102661, filed Aug. 4, 2021, the entire disclosures of all of which are herein incorporated by reference as a part of this application.

BACKGROUND

Field

Various embodiments of the disclosure relate to an electronic device and an operation method thereof, and more particularly, to an electronic device for performing image quality processing, and an operation method thereof.

Description of the Related Art

With the increase in the supply of electronic devices capable of outputting high-resolution content according to technological developments, the high-resolution content therefor is also gradually increasing. When the resolution of content input to the electronic devices is increased, the size of an intellectual property (IP) block for image quality processing also needs to be increased. However, when the size of the IP block is increased, various issues, such as costs, complexity, power consumption, heat generation, and the like, may occur.

Accordingly, a high-efficiency image quality processing technology for performing image quality processing on an ultra-high resolution image without increasing a size of an IP block is required.

SUMMARY

According to an embodiment of the disclosure, a method of an electronic device, includes: obtaining a low-resolution input image by down-sampling a high-resolution input image; obtaining a low-resolution output image by performing image quality processing on the low-resolution input image; obtaining a low-resolution model from a conversion relationship between the low-resolution input image prior to the image quality processing being performed and the low-resolution output image subsequent to the image quality processing being performed; obtaining a high-resolution model based on the low-resolution model; and obtaining a high-resolution output image from the high-resolution input image, by applying the high-resolution model to the high-resolution input image.

The down-sampling of the high-resolution input image may include: dividing the high-resolution input image into a plurality of pixel groups; and selecting a pixel of which a pixel value change amount in the plurality of pixel groups is equal to or greater than a reference value.

The obtaining of the low-resolution model may include obtaining, as the low-resolution model, a linear regression model indicating a conversion relationship between a pixel value of an input pixel of the low-resolution input image and a pixel value of an output pixel of the low-resolution output image, the output pixel corresponding to the input pixel.

The linear regression model may be obtained by using a conversion relationship between pixel values of a reference region including the input pixel and pixel values of a region corresponding to the reference region and including the output pixel.

The obtaining of the low-resolution model may further include: obtaining pixel value change amounts of pixels included in a standard region in the low-resolution input image, the standard region including the input pixel; and obtaining the reference region with an adjusted size by adjusting a size of the standard region according to the pixel value change amounts.

The obtaining of the high-resolution model, based on the low-resolution model may include: up-sampling the low-resolution model; and obtaining the high-resolution model by modifying the up-sampled low-resolution model, based on a difference between the high-resolution input image and the low-resolution input image.

The up-sampling of the low-resolution model may include obtaining a linear regression model regarding pixels of the high-resolution input image down-sampled to the input pixel by using the linear regression model regarding the input pixel.

The input pixel may be a first input pixel and the up-sampling of the low-resolution model may include obtaining the linear regression model regarding the pixels of the high-resolution input image down-sampled to the first input pixel, by interpolating the linear regression model regarding the first input pixel and a linear regression model regarding a second input pixel adjacent to the first input pixel.

The obtaining of the high-resolution model may include: obtaining a reliability weight for each pixel of the high-resolution input image, based on a pixel value difference between the high-resolution input image and the low-resolution input image; and obtaining the high-resolution model by applying the reliability weight to the up-sampled low-resolution model.

The reliability weight may be obtained based on a pixel value difference between a certain region of the high-resolution input image and the low-resolution input image obtained by being down-sampled from the certain region.

According to another embodiment of the disclosure, an electronic device includes: a signal processor; a memory storing one or more instructions; and a processor configured to execute the one or more instructions stored in the memory to control the signal processor, wherein the signal processor is configured to, according to control by the processor: obtain a low-resolution input image by down-sampling a high-resolution input image; obtain a low-resolution output image by performing image quality processing on the low-resolution input image; obtain a low-resolution model from a conversion relationship between the low-resolution input image prior to the image quality processing being performed and the low-resolution output image subsequent to the image quality processing being performed; obtain a high-resolution model, based on the low-resolution model; and obtain a high-resolution output image from the high-resolution input image, by applying the high-resolution model to the high-resolution input image.

According to an embodiment of the disclosure, a non-transitory computer-readable recording medium has recorded thereon a program for implementing an operation of an electronic device, the operation method including: obtaining a low-resolution input image by down-sampling a high-resolution input image; obtaining a low-resolution output image by performing image quality processing on the low-resolution input image; obtaining a low-resolution model from a conversion relationship between the low-resolution input image prior to the image quality processing being performed and the low-resolution output image subsequent to the image quality processing being performed; obtaining a high-resolution model based on the low-resolution model; and obtaining a high-resolution output image from the high-resolution input image, by applying the high-resolution model to the high-resolution input image.

BRIEF DESCRIPTION OF DRAWINGS

The above and/or other aspects of the disclosure will be more apparent by describing certain embodiments of the disclosure with reference to the accompanying drawings, in which.

DETAILED DESCRIPTION

Figure 1:
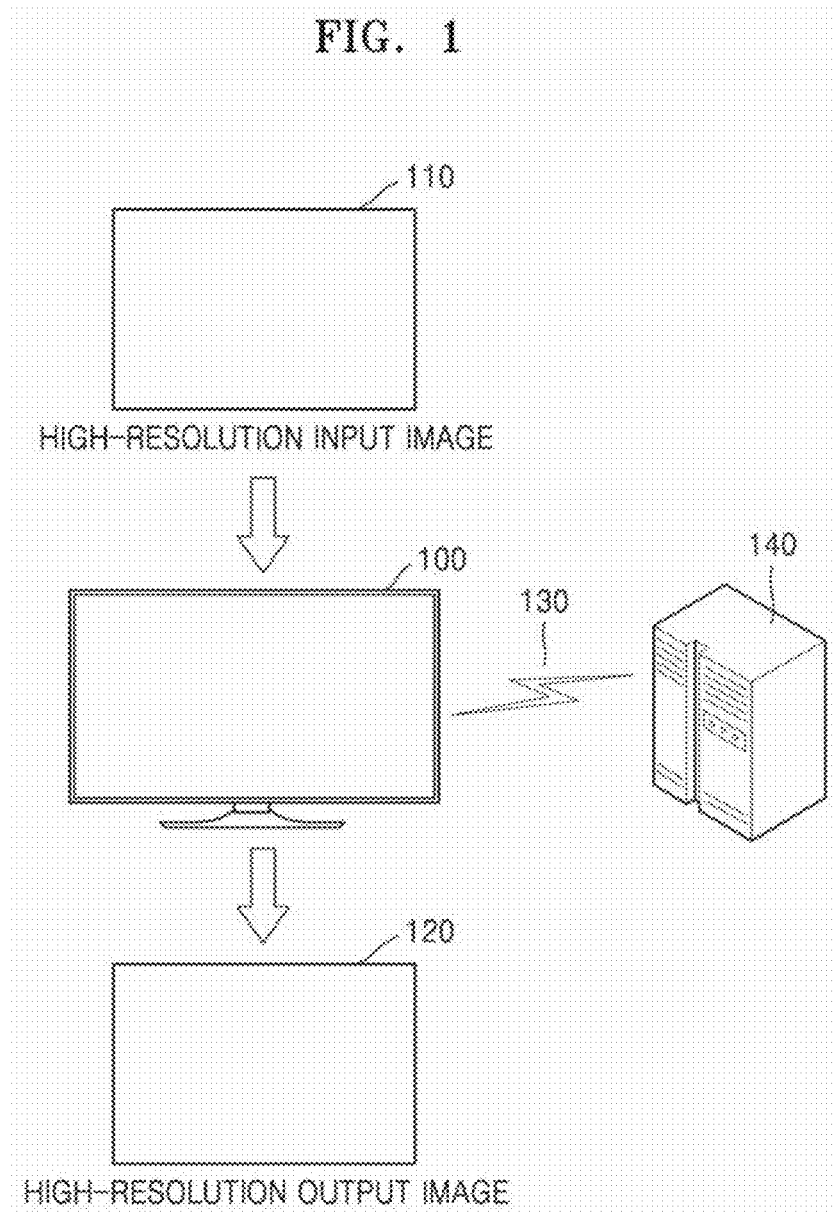
FIG. 1 is a diagram for describing a display device outputting a high-resolution output image by receiving a high-resolution input image, according to an embodiment of the disclosure.

Embodiments described in the specification and configurations illustrated in the drawings are merely preferred examples of the embodiments of the disclosure, and may be modified in various different ways at the time of filing of the present application to replace the embodiments and drawings of the specification.

Throughout the disclosure, the expression "at least one of a, b or c" indicates only a, only b, only c, both a and b, both a and c, both b and c, all of a, b, and c, or variations thereof.

Hereinafter, embodiments of the disclosure will be described in detail with reference to the accompanying drawings such that one of ordinary skill in the art may easily implement the disclosure. However, the disclosure may be implemented in various different forms and is not limited to the embodiments of the disclosure described herein.

Terms used in the disclosure are described as general terms currently used in consideration of functions described in the disclosure, but the terms may have different meanings according to an intention of one of ordinary skill in the art, precedent cases, or the appearance of new technologies. Thus, the terms used herein should not be interpreted only by its name, but have to be defined based on the meaning of the terms together with the description throughout the specification.

Also, the terms used in the disclosure are only used to describe specific embodiments of the disclosure, and are not intended to limit the disclosure.

Throughout the specification, when a part is "connected" to another part, the part may not only be "directly connected" to the other part, but may also be "electrically connected" to the other part with another element in between.

"The" and similar directives used in the present specification, in particular, in claims, may indicate both singular and plural. Also, unless there is a clear description of an order of operations describing a method according to the disclosure, the operations described may be performed in a suitable order. The disclosure is not limited by the order of description of the described operations.

The phrases "some embodiments of the disclosure" or "an embodiment of the disclosure" appearing in various places in this specification are not necessarily all referring to the same embodiment of the disclosure.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

In addition, terms such as "unit" and "module" described in the specification denote a unit that processes at least one function or operation, which may be implemented in hardware or software, or implemented in a combination of hardware and software.

In embodiments of the disclosure, the term "user" denotes a person who controls functions or operations of an electronic device by using the electronic device, and may include a viewer, a consumer, a manager, or an installation engineer.

Provided are an electronic device for obtaining a reliability weight, based on a similarity between a high-resolution image and a low-resolution image obtained by down-sampling the high-resolution image, and an operation method thereof.

Provided are an electronic device for obtaining a low-resolution model, based on a conversion relationship between low-resolution images before and after image processing, and an operation method thereof.

Provided are an electronic device for obtaining a high-resolution model by using a low-resolution model and a reliability weight, and obtaining a high-resolution output image from a high-resolution input image by using the high-resolution model, and an operation method thereof.

An electronic device and an operation method thereof, according to an embodiment of the disclosure, can obtain a reliability weight, based on a similarity between a high-resolution image and a low-resolution image obtained by down-sampling the high-resolution image.

An electronic device and an operation method thereof, according to an embodiment of the disclosure, can obtain a low-resolution model, based on a conversion relationship between low-resolution images before and after image quality processing.

An electronic device and an operation method thereof, according to an embodiment of the disclosure, can obtain a high-resolution model by using a low-resolution model and a reliability weight, and obtain a high-resolution output image from a high-resolution input image by using the high-resolution model.

Hereinafter, embodiments of the disclosure will be described in detail with reference to accompanying drawings.

FIG. 1 is a diagram for describing a display device 100 outputting a high-resolution output image 120 by receiving a high-resolution input image 110, according to an embodiment of the disclosure.

Referring to FIG. 1, the display device 100 may be an electronic device capable of processing and outputting an image. The display device 100 may be a fixed type or a movable type, and may be a digital television (TV) capable of receiving a digital broadcast, but is not limited thereto and may be implemented as various types of electronic devices including a display.

The display device 100 may include at least one of a desktop computer, a smartphone, a tablet personal computer (PC), a mobile phone, a video phone, an e-book reader, a laptop PC, a netbook computer, a digital camera, a personal digital assistant (PDA), a portable multimedia player (PMP), a camcorder, a navigation device, a wearable device, a smart watch, a home network system, a security system, or a medical device.

The display device 100 may be implemented as not only a flat display device, but also a curved display device with a screen having a curvature or a flexible display device with an adjustable curvature. Output definition of the display device 100 may include, for example, high definition (HD), full HD, ultra HD, or definition clearer than ultra HD.

The display device 100 may output an image. The image is visual information displayable on a screen, and may include a still image or a video. The video may include a plurality of frames. The video may include TV programs provided by content providers or items, such as various movies or TV series, via video-on-demand (VOD) services. The content provider may refer to a terrestrial broadcasting station or cable broadcasting station providing, to a user, various types of content including the image, an over-the-top service provider, or an internet protocol TV (IPTV) service provider.

With the increase in supply of electronic devices capable of outputting high-resolution content, high-resolution content provided by the content provider is also increasing. Because the number of pixels for representing an image is increased when resolution of content is increased, the number of pixels to be processed by an electronic device during a same time is also increased. Accordingly, to process the high-resolution content, a size of a signal processing unit performing image quality processing in the electronic device needs to correspond to the resolution of the content. The signal processing unit may include, for example, an intellectual property (IP) block. The IP block is a semiconductor IP core and may denote a reusable unit of logic, cell, or integrated circuit layout design that is the intellectual property of one party. However, when a size of the IP block is increased, issues, such as complexity, costs, power consumption, and heat generation, may occur.

According to an embodiment of the disclosure, the display device 100 may process a high-resolution image with low complexity, by using an image quality processing IP block capable of processing low-resolution content.

In this regard, upon receiving the high-resolution input image 110, the display device 100 may down-sample the received high-resolution input image 110, thereby obtaining a low-resolution input image. For example, when the high-resolution input image 110 is an image having resolution of 8 K, and an image processible by the display device 100 is an image having resolution of 4 K, the display device 100 may obtain the low-resolution input image having resolution of 4 K by down-sampling the high-resolution input image 110.

According to an embodiment of the disclosure, the display device 100 may obtain a low-resolution output image by performing image quality processing on the low-resolution input image. For example, the display device 100 may obtain the low-resolution output image of 4 K by performing image quality processing on the low-resolution input image having resolution of 4 K, by using an image quality processing IP block having low complexity.

According to an embodiment of the disclosure, the display device 100 may obtain a low-resolution model from a conversion relationship between the low-resolution input image and the low-resolution output image. The display device 100 may obtain the low-resolution model for each pixel, by using a relationship between a pixel value of the low-resolution input image and a pixel value of the low-resolution output image.

According to an embodiment of the disclosure, the display device 100 may obtain a high-resolution model, based on the low-resolution model.

According to an embodiment of the disclosure, the display device 100 may obtain a high-resolution output image 120 from the high-resolution input image 110, by using the high-resolution model. In other words, in the above example, the display device 100 may obtain the high-resolution output image 120 having resolution of 8 K by applying the high-resolution model to the high-resolution input image 110 having resolution of 8 K.

According to another embodiment of the disclosure, the image quality processing IP block may not be included in the display device 100, but may be included in a device separate from the display device 100. For example, the image quality processing IP block performing the image quality processing may be included in an external computing device or server 140. In this case, the display device 100 may transmit the high-resolution input image 110 to the computing device or server 140 through a communication network 130.

The server 140 may down-sample the high-resolution input image 110 received from the display device 100 to an image having processible resolution, and perform image quality processing on the down-sampled low-resolution input image. The server 140 may obtain the low-resolution model from the conversion relationship between the low-resolution input image after the image quality processing and the low-resolution input image before the image quality processing, and obtain the high-resolution model, based on the low-resolution model. The server 140 may obtain the high-resolution output image 120 by applying the high-resolution model to the high-resolution input image 110, and transmit the high-resolution output image 120 to the display device 100 via the communication network 130.

The display device 100 may output, on a screen, the high-resolution output image 120 received from the server 140.

As such, according to an embodiment of the disclosure, the display device 100 or the server 140 connected to the display device 100 via the communication network 130 may obtain the low-resolution input image by down-sampling the high-resolution input image 110, perform the image quality processing on the low-resolution input image, and obtain the low-resolution model by modeling a relationship between low-resolution images before and after the image quality processing.

Also, according to an embodiment of the disclosure, the display device 100 may obtain the high-resolution model by using the low-resolution model and process the high-resolution input image 110 by using the high-resolution model, thereby obtaining the high-resolution output image 120 from the high-resolution input image 110.

Accordingly, the display device 100 or server 140 may obtain the high-resolution output image 120 by processing the high-resolution input image 110 even when a signal processing unit capable of processing only resolution lower than that of the high-resolution input image 110 is included.

Figure 2:
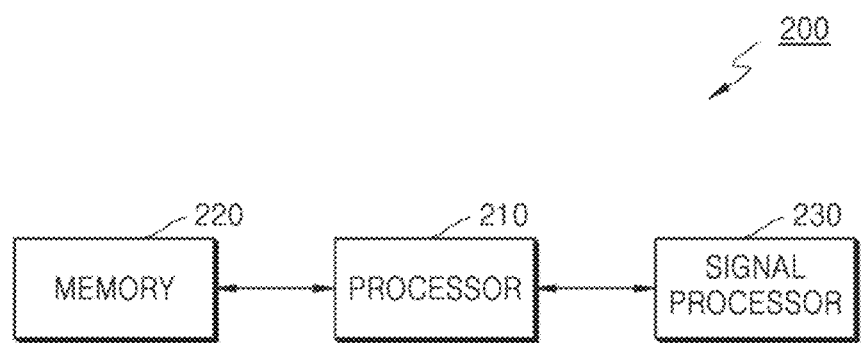
FIG. 2 is an internal block diagram of an electronic device according to an embodiment of the disclosure.

FIG. 2 is an internal block diagram of an electronic device 200 according to an embodiment of the disclosure.

Referring to FIG. 2, the electronic device 200 may include a processor 210, a memory 220, and a signal processor 230.

The electronic device 200 of FIG. 2 may be an example of the display device 100 or server 140 of FIG. 1.

According to an embodiment of the disclosure, the electronic device 200 may include the signal processor 230, the memory 220 storing one or more instructions, and the processor 210 configured to execute the one or more instructions stored in the memory 220, wherein the processor 210 executes the one or more instructions to control the signal processor 230.

The signal processor 230 may, according to control by the processor 210, obtain a low-resolution input image by down-sampling a high-resolution input image, obtain a low-resolution output image by performing image quality processing on the low-resolution input image, obtain a low-resolution model from a conversion relationship between the low-resolution input image and the low-resolution output image, obtain a high-resolution model based on the low-resolution model, and obtain a high-resolution output image from the high-resolution input image, by using the high-resolution model.

According to an embodiment of the disclosure, the memory 220 may store at least one instruction. The memory 220 may store at least one program executed by the processor 210. The memory 220 may store a pre-defined operation rule or an artificial intelligence (AI) model. Also, the memory 220 may store data input to or output from the electronic device 200.

The memory 220 may include at least one type of storage medium among a flash memory type, a hard disk type, a multimedia card micro type, a card type memory (for example, a secure digital (SD) or an extreme digital (XD) memory), random access memory (RAM), static RAM (SRAM), read-only memory (ROM), electrically erasable programmable ROM (EEPROM), programmable ROM (PROM), a magnetic memory, a magnetic disk, and an optical disk.

The processor 210 according to an embodiment of the disclosure may control overall operations of the electronic device 200. The processor 210 may execute the one or more instructions stored in the memory 220 to control the electronic device 200 to operate.

According to an embodiment of the disclosure, the processor 210 may control operations of the signal processor 230 such that the signal processor 230 obtains an output image by performing signal processing on an input image.

The signal processor 230 according to an embodiment of the disclosure may obtain the high-resolution output image from the high-resolution input image, according to control by the processor 210.

According to an embodiment of the disclosure, the signal processor 230 may obtain the low-resolution input image by down-sampling the high-resolution input image to an image of resolution processible by the signal processor 230.

According to an embodiment of the disclosure, the signal processor 230 may obtain the low-resolution output image by performing image quality processing on the low-resolution input image. The signal processor 230 may adjust contrast of the low-resolution input image or improve quality of the low-resolution input image by removing blur, noise, distortion, or the like.

According to an embodiment of the disclosure, the signal processor 230 may model a conversion relationship between the low-resolution input image before the image quality processing and the low-resolution output image after the image quality processing. The signal processor 230 may obtain the low-resolution model indicating the conversion relationship between the low-resolution input image and the low-resolution output image, and obtain the high-resolution model by using the low-resolution model.

According to an embodiment of the disclosure, the signal processor 230 may obtain the high-resolution output image by processing the high-resolution input image, by using the high-resolution model.

Figure 3:
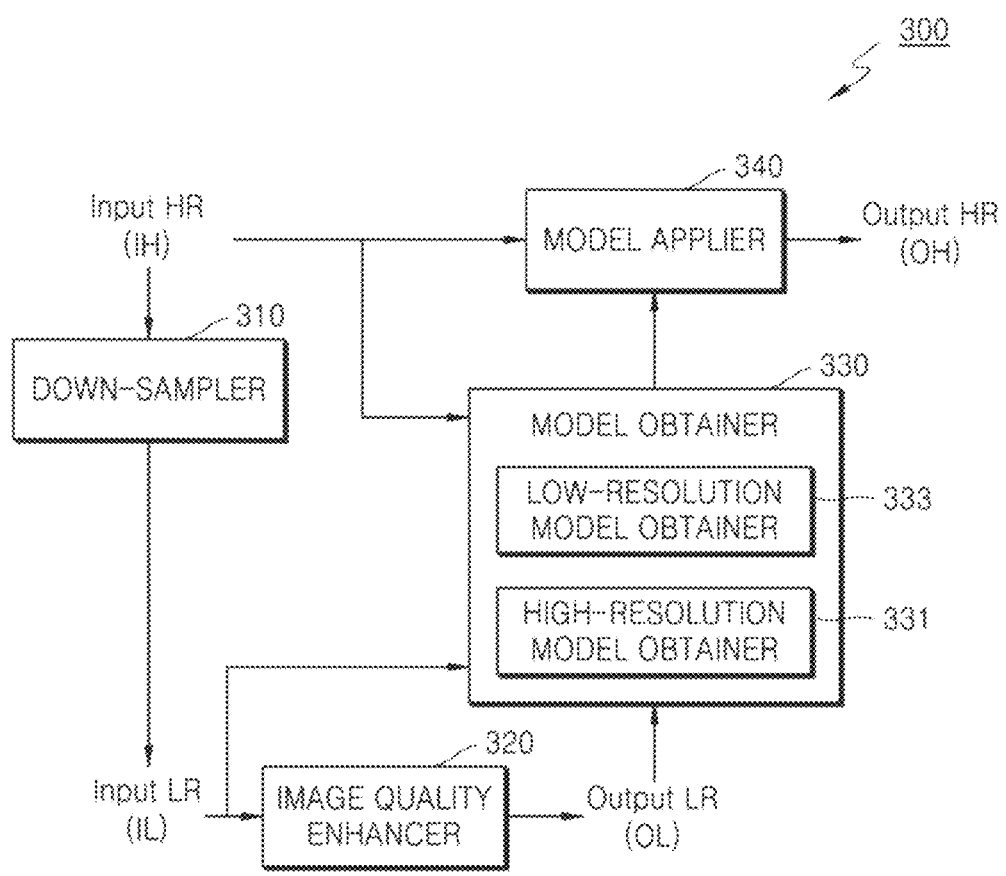
FIG. 3 is an internal block diagram of a signal processor according an embodiment of the disclosure.

FIG. 3 is an internal block diagram of a signal processor 300 according to an embodiment of the disclosure.

The signal processor 300 of FIG. 3 may be an example of the signal processor 230 included in the electronic device 200 of FIG. 2. Hereinafter, descriptions about details overlapping those described in FIG. 2 are omitted.

Referring to FIG. 3, the signal processor 300 may include a down-sampler 310, an image quality enhancer 320, a model obtainer 330, and a model applier 340.

The down-sampler 310 according to an embodiment of the disclosure may obtain a low-resolution input image by down-sampling a high-resolution input image. The down-sampler 310 may perform down-sampling by reducing the number of pixels of the high-resolution input image.

When resolution of the high-resolution input image (Input HR (IH)) is higher than resolution processible by the signal processor 300, the down-sampler 310 may reduce the high-resolution input image to an image having resolution processible by the signal processor 300.

The down-sampler 310 may perform the down-sampling via any one of various methods.

The down-sampler 310 may reduce an image by using at least one of various down-sampling methods, such as a nearest method, a bilinear method, a bicubic method, and a Lanczos method.

For example, the down-sampler 310 may divide the high-resolution input image into a plurality of pixel groups, calculate an average of pixels included in each pixel group, and compress the pixels of each pixel group into an average pixel. Alternatively, the down-sampler 310 may perform the down-sampling by selecting a pixel from a center of the pixel group and changing colors of the pixels of the pixel group into a color of the selected pixel. Alternatively, the down-sampler 310 may compress the pixel group by determining the colors of pixels by using a weighted average of the pixels included in the pixel group.

According to an embodiment of the disclosure, the down-sampler 310 may perform the down-sampling independently for each pixel group. For example, the down-sampler 310 may perform the down-sampling by selecting pixels at different locations according to the pixel groups, such as selecting a first pixel from a first pixel group and selecting a second pixel from a second pixel group.

According to an embodiment of the disclosure, the down-sampler 310 may select a specific pixel, in consideration of a relationship between the pixels included in each pixel group. For example, the down-sampler 310 may perform the down-sampling by selecting a pixel having a large change amount regarding a relationship with an adjacent pixel from among the plurality of pixels included in the pixel group. For example, the down-sampler 310 may divide the high-resolution input image into a plurality of groups and perform scanning for each group to obtain pixel value change amounts of pixels in the group. The down-sampler 310 may perform the down-sampling by selecting a pixel of which a pixel value change amount in the group is equal to or greater than a reference value. When there are a plurality of pixels of which the pixel value change amounts are equal to or greater than the reference value, the down-sampler 310 may select a pixel of which the pixel value change amount is the highest thereamong.

According to an embodiment of the disclosure, the down-sampler 310 may perform the down-sampling by using different methods for each group.

According to an embodiment of the disclosure, the down-sampler 310 may perform the down-sampling by selecting a pixel located at a center from among pixels included in the group, when the pixel value change amounts in the group are equal to or lower than the reference value, and may perform the down-sampling by selecting a pixel of which the pixel value change amount is the highest from among the pixels included in the group, when the pixel value change amounts in the group are greater than the reference value. As such, according to an embodiment of the disclosure, the down-sampler 310 may perform the down-sampling by selecting a pixel via any one of various methods. Also, the down-sampler 310 may perform the down-sampling by selecting a pixel of which the pixel value change amount is the highest with respect to a relationship with an adjacent pixel, thereby preventing a detail loss generated when a detail pixel greatly different from an adjacent pixel is not selected.

The down-sampler 310 may obtain the low-resolution input image (Input LR (IL)) by down-sampling the high-resolution input image.

The image quality enhancer 320 according to an embodiment of the disclosure may perform image quality processing on the low-resolution input image obtained by the down-sampler 310. The image quality enhancer 320 may obtain a low-resolution output image (Output LR (OL)) by improving quality and information content of the low-resolution input image. The image quality enhancer 320 may obtain the low-resolution output image from the low-resolution input image by performing contrast enhancement, noise reduction, edge detection, or the like.

The model obtainer 330 according to an embodiment of the disclosure may obtain a model to be applied to the high-resolution input image (IH). According to an embodiment of the disclosure, the model obtainer 330 may include a low-resolution model obtainer 331 and a high-resolution model obtainer 333.

The low-resolution model obtainer 331 according to an embodiment of the disclosure may model a conversion relationship between the low-resolution input image and the low-resolution output image. In other words, the low-resolution model obtainer 331 may obtain, as a linear regression model, a conversion relationship between images having low resolution from the conversion relationship between the low-resolution input image and the low-resolution output image having enhanced image quality by the image quality enhancer 320.

The high-resolution model obtainer 333 according to an embodiment of the disclosure may obtain a high-resolution model applicable to the high-resolution input image by using the linear regression model obtained by the low-resolution model obtainer 331.

The model applier 340 according to an embodiment of the disclosure may obtain the high-resolution output image (Output HR (OH)) by applying the high-resolution model to the high-resolution input image (IH).

Hereinafter, processes by which the low-resolution model obtainer 331 obtains the low-resolution model will be described in detail with reference to FIGS. 4 and 5.

Figure 4:
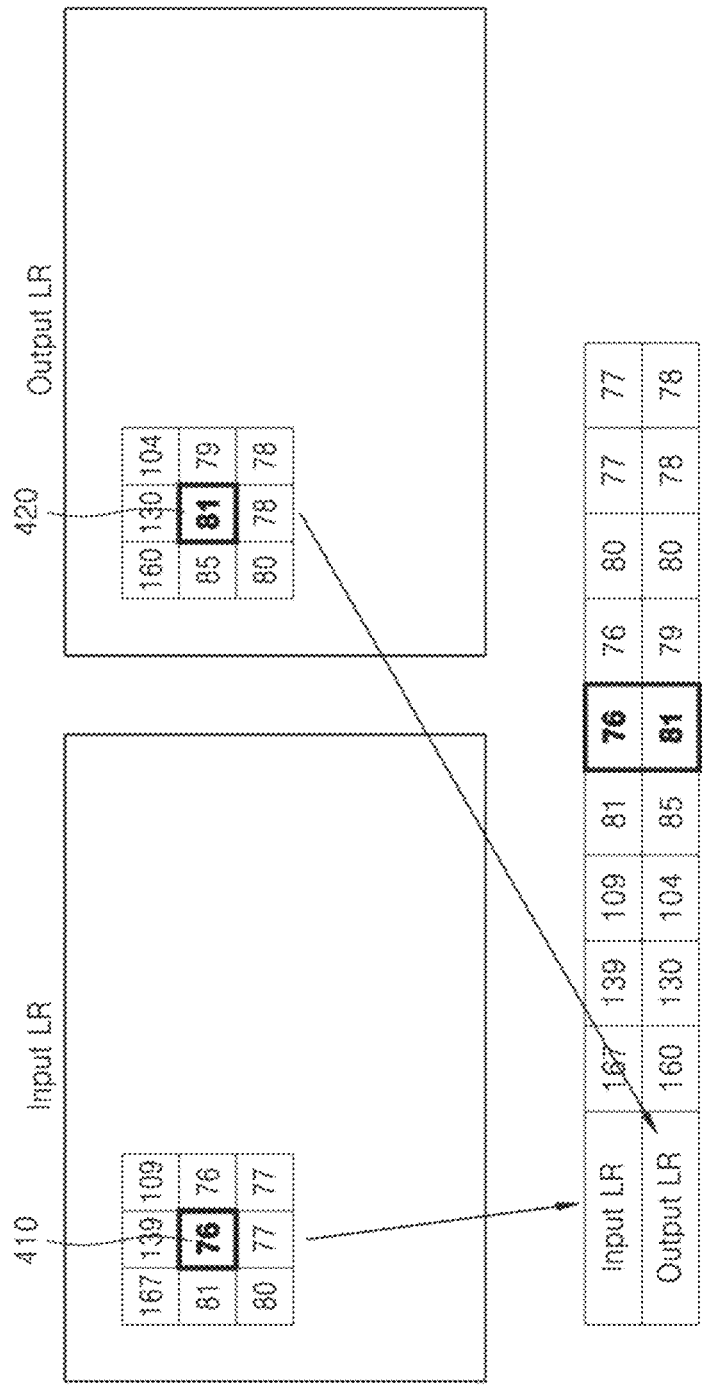
FIG. 4 is a diagram for describing a method of obtaining a low-resolution model, according to an embodiment of the disclosure.

FIG. 4 is a diagram for describing a method of obtaining the low-resolution model, according to an embodiment of the disclosure.

According to an embodiment of the disclosure, the low-resolution model obtainer 331 may model the conversion relationship between the low-resolution input image (IL) and the low-resolution output image (OL).

Hereinafter, for convenience of description, a pixel included in the low-resolution input image will be referred to as an input pixel and a pixel included in the low-resolution output image will be referred to as an output pixel.

FIG. 4 illustrates obtaining of the low-resolution model with respect to a first input pixel 410 included in the low-resolution input image. As described above, the image quality enhancer 320 may obtain the low-resolution output image by performing the image quality processing on the low-resolution input image. In other words, input pixels included in the low-resolution input image may be respectively converted into output pixels included in the low-resolution output image, by the image quality enhancer 320.

According to an embodiment of the disclosure, the low-resolution model obtainer 331 may model a conversion relationship between the first input pixel 410 included in the low-resolution input image and a first output pixel 420 included in the low-resolution output image and having the same coordinates as the first input pixel 410.

According to an embodiment of the disclosure, the low-resolution model obtainer 331 may select pixel values in standard regions, for example, 3×3 regions adjacent to the first input pixel 410 and first output pixel 420, with respect to the first input pixel 410 included in the low-resolution input image and the first output pixel 420 included in the low-resolution output image and corresponding to the first input pixel 410. The low-resolution model obtainer 331 may obtain a low-resolution model regarding the first input pixel 410 from a relationship between the pixel values included in the standard region.

Figure 5:
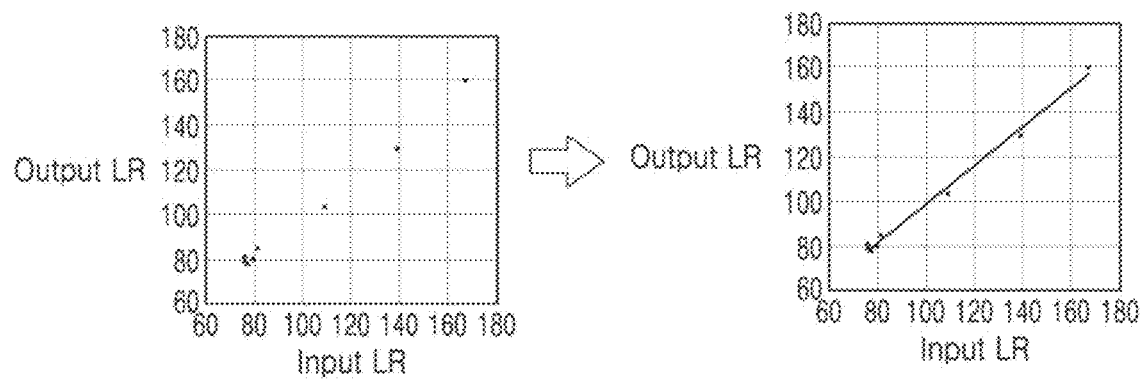
FIG. 5 is a diagram for describing a method of obtaining a low-resolution model by using a linear regression model, according to an embodiment of the disclosure.

Here, the pixel values included in the standard regions may be indicated as graphs shown in FIG. 5.

FIG. 5 is a diagram for describing a method of obtaining the low-resolution model by using a linear regression model, according to an embodiment of the disclosure.

FIG. 5 illustrates the pixel values of pixels included in the standard regions in graphs. Referring to FIG. 5, x-axes of the graphs indicate pixel values of the low-resolution input image and y-axes of the graphs indicate pixel values of corresponding pixels of the low-resolution output image. Dots indicated in the graphs of FIG. 5 indicate correlations between input pixel values and output pixel values of a plurality of pixels included in the standard region.

A regression analysis is a statistical method describing a relationship between two or more variables in a functional equation. Here, the functional equation describing the relationship is referred to as a regression model or a regression equation. When a relationship between two variables x and y is linear, a function equation between the two variables may be obtained as a regression line, i.e., a linear regression model.

As shown in the graphs of FIG. 5, a correlation between an input pixel included in the low-resolution input image and an output pixel included in the low-resolution output image may be modeled via the regression analysis.

To use the regression analysis in image processing, modeling needs to be performed in real-time for each of all input pixels. In this regard, Gauss' method of least squares may be used. The method of least squares is a line-fitting procedure for reducing a difference between a regression line and corresponding observation values, and is a method of searching for a straight line, in which a sum of squares of an error between a data value and a regression equation is the minimum, via many repetitions. In other words, to model the relationship between the input pixel and the output pixel via the regression analysis, it is required to find a straight line, in which a square of a distance from each dot in the graphs of FIG. 5 to the straight line is the minimum. However, such a repetitive convergence method requires a lot of time, and thus it not suitable when an input image needs to be processed in real-time.

Thus, according to an embodiment of the disclosure, to perform regression without repetition, the low-resolution model obtainer 331 may obtain, from the relationship between the low-resolution input image and the low-resolution output image, a linear regression model including only a slope α and a constant β that is a y-intercept, as in Equation 1 below.

$$y = \alpha x + \beta \qquad \text{[Equation 1]}$$

Here, y and x respectively correspond to the low-resolution output image (OL) and the low-resolution input image (IR).

According to an embodiment of the disclosure, the low-resolution model obtainer 331 may obtain the slope and constant of the linear regression model of Equation 1 by using Equation 2 below.

$$\alpha = \frac{\text{Cov}(x, y)}{\text{Var}(x)}, \beta = \bar{y} - \alpha \bar{x} \qquad \text{[Equation 2]}$$

Here, Var denotes a variance and Coy denotes a covariance. $\bar{y}$ and $\bar{x}$ respectively denote averages of y and x.

The low-resolution model obtainer 331 may obtain the variance and the covariance by using a pixel value of the first input pixel 410 and a pixel value of the first output pixel 420, and obtain the slope α of the linear regression model by calculating a ratio of the variance to covariance. The low-resolution model obtainer 331 may obtain $\bar{x}$ and $\bar{y}$ respectively as averages of pixel values of the plurality of pixels included in the standard regions of the low-resolution input image and low-resolution output image, and obtain β by using the slope α of the linear regression model.

Hereinafter, the slope α of the linear regression model obtained by the low-resolution model obtainer 331 will be referred to as $\alpha_{LR}$ (AlphaLR), and β will be referred to as $\beta_{LR}$ (BetaLR). In other words, according to an embodiment of the disclosure, the low-resolution model may be obtained via $y = \alpha_{LR} x + \beta_{LR}$, as in Equation 1.

As such, according to an embodiment of the disclosure, the low-resolution model obtainer 331 obtains the low-resolution model via a linear equation of a simple form as in Equation 1, thereby reducing a time or throughput consumed to obtain the low-resolution model.

Also, according to an embodiment of the disclosure, the low-resolution model obtainer 331 not only simply obtains the difference between the pixel value of the low-resolution input image and the corresponding pixel value of the low-resolution output image, but also models a pixel value relationship between the pixels included in the standard regions around the pixels, thereby more accurately modeling a conversion relationship between pixels before image quality processing and after image quality processing.

According to an embodiment of the disclosure, the low-resolution model obtainer 331 may obtain the low-resolution model for each of all pixels included in an image. The low-resolution model obtainer 331 may obtain $\alpha_{LR}$ and $\beta_{LR}$ for each of all pixels included in the low-resolution input image. Accordingly, the number of low-resolution models obtained by the low-resolution model obtainer 331 may be equal to the number of pixels included in the low-resolution input image, i.e., resolution.

According to an embodiment of the disclosure, the low-resolution model obtainer 331 may adjust a size of the standard region being referred to for regression. In other words, in FIG. 4, the low-resolution model obtainer 331 obtains the low-resolution model regarding the first input pixel 410 by using the pixel values of the pixels included in the standard regions by selecting, as the standard regions, the pixel values of 3×3 regions adjacent to the first input pixel 410 and first output pixel 420, but an embodiment of the disclosure is not limited thereto. For example, the standard region may be an entire frame or may be a region including some pixels included in the frame. The standard region may include only one pixel.

According to an embodiment of the disclosure, the low-resolution model obtainer 331 may adjust the size of the standard region, based on pixel value change amounts of the pixels included in the standard region including the first input pixel 410 and present in the low-resolution input image. The low-resolution model obtainer 331 may obtain the pixel value change amounts of the standard region and adjust the size of the standard region according to the pixel value change amounts of the standard region.

According to an embodiment of the disclosure, the low-resolution model obtainer 331 may adjust the standard region to be small when the pixel value change amounts of the standard region are large. When the adjusted standard region is referred to as a reference region, the low-resolution model obtainer 331 may obtain the low-resolution model regarding the first input pixel 410 by using pixel values of pixels included in the reference region smaller than the standard region.

According to an embodiment of the disclosure, when the pixel value change amounts of the standard region are small, i.e., when the pixel values of pixels included in the standard region are similar, the low-resolution model obtainer 331 may adjust the size of the standard region to be larger. The low-resolution model obtainer 331 may obtain the slope $\alpha_{LR}$ and the constant $\beta_{LR}$ by applying, to Equation 2, the pixel values of pixels in the adjusted standard region, i.e., the reference region larger than the standard region, and obtain the low-resolution model of Equation 1, based thereon.

As such, according to an embodiment of the disclosure, the low-resolution model obtainer 331 obtains the low-resolution model regarding the first input pixel 410 by adjusting the size of the standard region, based on the pixel value change amounts of adjacent pixels of the first input pixel 410, i.e., the pixels included in the standard region, thereby more accurately modeling the conversion relationship between the low-resolution input image and the low-resolution output image.

Figure 6:
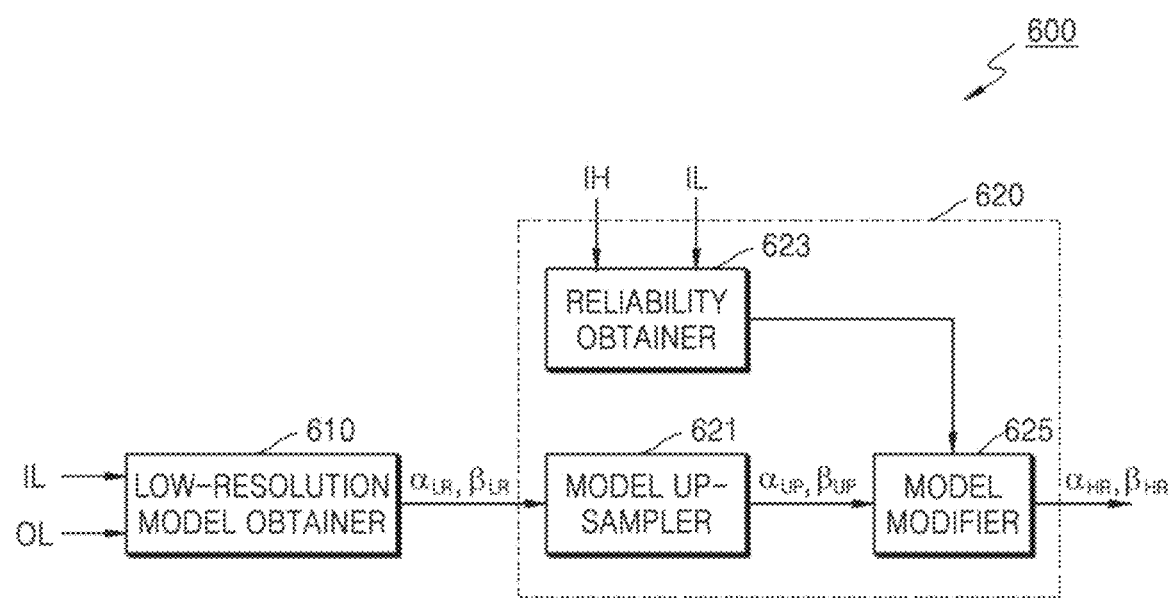
FIG. 6 is an internal block diagram of a model obtainer according to an embodiment of the disclosure.

FIG. 6 is an internal block diagram of a model obtainer 600 according to an embodiment of the disclosure.

The model obtainer 600 of FIG. 6 may be an example of the model obtainer 330 of FIG. 3. Hereinafter, descriptions about details overlapping those described in FIG. 3 are omitted.

Referring to FIG. 6, the model obtainer 600 may include a low-resolution model obtainer 610 and a high-resolution model obtainer 620.

According to an embodiment of the disclosure, the low-resolution model obtainer 610 may obtain a low-resolution model by modeling a conversion relationship between a low-resolution input image and a low-resolution output image having enhanced image quality.

According to an embodiment of the disclosure, the low-resolution model obtainer 610 may obtain, as a linear equation, i.e., a linear regression model, a conversion relationship between a pixel value of a first input pixel included in the low-resolution input image and a pixel value of a first output pixel of the low-resolution output image, the first output pixel corresponding to the first input pixel. The low-resolution model obtainer 610 may obtain the linear regression model for each of all pixels included in the low-resolution input image.

According to an embodiment of the disclosure, the high-resolution model obtainer 620 may obtain a high-resolution model by using the linear regression model obtained by the low-resolution model obtainer 610. The high-resolution model obtainer 620 may include a model up-sampler 621, a reliability obtainer 623, and a model modifier 625.

According to an embodiment of the disclosure, the model up-sampler 621 may up-sample the low-resolution model. The model up-sampler 621 may up-sample the low-resolution model by up-sampling a slope $\alpha_{LR}$ and a constant $\beta_{LR}$ included in the low-resolution model. The model up-sampler 621 may obtain a plurality of models by up-sampling the low-resolution model obtained for one pixel included in the low-resolution input image, according to the number of pixels included in a high-resolution input image.

According to an embodiment of the disclosure, the model up-sampler 621 may perform up-sampling on a model via any one of various methods. The model up-sampler 621 may up-sample a slope $\alpha$ and a constant $\beta$ of the model by using any one of various up-sampling methods, such as a nearest method, a bilinear method, a joint bilateral method, and the like.

For example, when the high-resolution input image is 8 K image and the electronic device 200 has down-sampled the high-resolution input image of 8 K to the low-resolution input image of 4 K, four pixels included in the high-resolution input image is reduced to one pixel included in the low-resolution input image.

According to an embodiment of the disclosure, the model up-sampler 621 may perform model up-sampling so as to apply the low-resolution model obtained for the low-resolution input image to the pixels of the high-resolution input image of 8 K. The model up-sampler 621 may obtain the up-sampled model $y=\alpha_{UP}x+\beta_{UP}$ from the low-resolution model $y=\alpha_{LR}x+\beta_{LR}$. In the up-sampled model, $\alpha_{UP}$ and $\beta_{UP}$ may respectively denote AlphaUP and BetaUP.

For example, when $\alpha_{LR}$ and $\beta_{LR}$ of the low-resolution model regarding a first input pixel are respectively $\alpha_{LR1}$ and $\beta_{LR1}$, the model up-sampler 621 may obtain $\alpha_{UP1}$ and $\beta_{UP1}$ of the up-sampled model by respectively up-sampling $\alpha_{LR1}$ and $\beta_{LR1}$ of the low-resolution model regarding the first input pixel included in the low-resolution input image of 4 K. Here, the up-sampled model $\alpha_{UP1}$, $\beta_{UP1}$ may be used as a model for each of four pixels before being down-sampled to the first input pixel.

According to an embodiment of the disclosure, the model up-sampler 621 may use $\alpha_{LR1}$ and $\beta_{LR1}$ regarding the first input pixel as $\alpha_{UP1}$ and $\beta_{UP1}$ of the up-sampled model regarding the four pixels down-sampled to the first input pixel. In this case, $\alpha_{LR1}=\alpha_{UP1}$ and, $\beta_{LR1}=\beta_{UP1}$.

Alternatively, the model up-sampler 621 may interpolate $\alpha_{LR1}$ and $\beta_{LR1}$ regarding the first input pixel together with $\alpha_{LR2}$ and $\beta_{LR2}$ of a model of a second input pixel located adjacent to the low-resolution input image, thereby obtaining $\alpha_{UP1}$ and $\beta_{UP1}$ of the up-sampled model regarding the four pixels included in the high-resolution input image. For example, the model up-sampler 621 may obtain $\alpha_{UP1}$ by using any one of various methods, such as polynomial interpolation, spline interpolation, and linear interpolation, using $\alpha_{LR1}$ and $\alpha_{LR2}$. Similarly, the model up-sampler 621 may interpolate $\beta_{LR1}$ and $\beta_{LR2}$ to obtain $\beta_{UP1}$.

The model up-sampler 621 may obtain the low-resolution model up-sampled regarding each pixel of the high-resolution input image, by up-sampling the slope and constant of the low-resolution model. The model up-sampler 621 may transmit, to the model modifier 625, the up-sampled low-resolution model obtained for each of all pixels included in the high-resolution input image.

According to an embodiment of the disclosure, the reliability obtainer 623 may obtain reliability of the low-resolution model by using the high-resolution input image (IH) and the low-resolution input image (IL). The reliability of the low-resolution model is decreased as a difference between the high-resolution input image and the low-resolution input image obtained by reducing the high-resolution input image is increased, and the reliability of the low-resolution model is increased as the difference between the high-resolution input image and the low-resolution input image is decreased. This is because, when the difference between the high-resolution input image and the low-resolution input image is large, the low-resolution model obtained based on the low-resolution input image with a large difference is low.

According to an embodiment of the disclosure, the reliability obtainer 623 may obtain the reliability of the low-resolution model, based on the difference between the high-resolution input image and the low-resolution input image. In detail, the reliability obtainer 623 may obtain reliability for each pixel of the high-resolution input image, based on a pixel value difference between the high-resolution input image and the low-resolution input image, and obtain a reliability weight based on the reliability.

According to an embodiment of the disclosure, the reliability obtainer 623 may obtain the pixel value difference between the high-resolution input image and the low-resolution input image, in units of regions or pixels. For example, the reliability obtainer 623 may obtain a difference between pixel values of four pixels included in the high-resolution input image and a pixel value of one pixel in the low-resolution input image, the one pixel down-sampled from the four pixels.

The reliability obtainer 623 may obtain the pixel value difference between the high-resolution input image and the low-resolution input image, in units of regions or pixels, via any one of various methods. For example, the reliability obtainer 623 may calculate, from pixels included in a certain region included in the high-resolution input image, a sum of absolute difference (SAD), a mean square error (MSE), an average value, or the like, and obtain a difference by comparing a calculated value with a pixel value of the low-resolution input image.

Alternatively, the reliability obtainer 623 may obtain, as the pixel value difference between the high-resolution input image and the low-resolution input image, from among the pixels included in the certain region of the high-resolution input image, a pixel value having a smallest difference from a pixel value of the low-resolution input image, a pixel value having a largest difference therefrom, an intermediate value of differences between pixel values, or a difference value after assigning different weights according to locations of the pixels.

For example, the reliability obtainer 623 may obtain a difference between an average value of pixel values in a region included in the high-resolution input image of 8 K and including four pixels before being down-sampled, and a pixel value of one pixel included in the low-resolution input image of 4 K and down-sampled from the four pixels. Alternatively, the reliability obtainer 623 may obtain, for each pixel, a difference between the pixel value of each of the four pixels included in the high-resolution input image of 8 K and a pixel value of one pixel included in the low-resolution input image of 4 K.

The reliability obtainer 623 may obtain different reliability weights depending on whether the pixel value difference is high or low, based on the pixel value difference between the pixel values of four pixels of the high-resolution input image and the pixel value of one pixel of the low-resolution input image.

According to an embodiment of the disclosure, the reliability weight may be a value representing reliability of the low-resolution model in a value between 0 and 1. For example, the reliability obtainer 623 may obtain 0 as the reliability weight when the pixel value difference is equal to or greater than a reference value, and obtain 1 as the reliability weight when the pixel value difference is smaller than the reference value. Alternatively, the reliability obtainer 623 may obtain a weight by subdividing the pixel value difference and the reliability weight according to the pixel value difference. For example, when the pixel value difference is equal to or less than a first reference value, the reliability obtainer 623 may obtain 1 as the reliability weight, when the pixel value difference is greater than the first reference value and equal to or less than a second reference value, the reliability obtainer 623 may obtain 0.5 as the reliability weight, and when the pixel value difference is greater than the second reference value, the reliability obtainer 623 may obtain 0 as the reliability weight.

The reliability obtainer 623 may obtain the reliability weights for all pixels included in the high-resolution input image, generate a reliability weight matrix therefrom, and transmit the reliability weight matrix to the model modifier 625.

According to an embodiment of the disclosure, the model modifier 625 may receive the up-sampled low-resolution model obtained for all pixels included in the high-resolution input image from the model up-sampler 621.

According to an embodiment of the disclosure, the model modifier 625 may obtain, from the reliability obtainer 623, the reliability weight for each of all pixels included in the high-resolution input image.

According to an embodiment of the disclosure, the model modifier 625 may apply the reliability weight matrix received from the reliability obtainer 623 to a model for each pixel included in the high-resolution input image to modify values of the slope and constant included in the up-sampled low-resolution model, thereby obtaining a high-resolution model.

According to an embodiment of the disclosure, the high-resolution model obtained by the model modifier 625 may be a model in which a slope and a constant are respectively $\alpha_{HR}$(AlphaHR) and $\beta_{HR}$(BetaHR).

For example, when the reliability of the low-resolution model is low, the model modifier 625 may modify the slope $\alpha_{UP}$ of the up-sampled low-resolution model regarding a corresponding pixel to a value close to 1. For example, when the reliability of the low-resolution model is 0, the model modifier 625 may modify the slope $\alpha_{UP}$ of the up-sampled low-resolution model regarding the corresponding pixel to 1. When the slope of the up-sampled low-resolution model is 1, a pixel value of an input pixel included in the high-resolution input image may be output by being changed only by the constant $\beta_{UP}$.

Alternatively, when the reliability of the low-resolution model is 0, the model modifier 625 may modify the slope $\alpha_{UP}$ of the up-sampled low-resolution model regarding the corresponding pixel to 1 and also modify the constant $\beta_{UP}$ to 0.

As such, according to an embodiment of the disclosure, the high-resolution model obtainer 620 may selectively apply the values of $\alpha_{UP}$ and $\beta_{UP}$ of the up-sampled low-resolution model according to the reliability of the low-resolution model, so as to prevent image quality processing to be performed on the high-resolution input image by using a model having low reliability. As such, according to an embodiment of the disclosure, the high-resolution model obtainer 620 may up-sample the low-resolution model obtained from the conversion relationship between the low-resolution input image and the low-resolution output image to obtain the high-resolution model ($\alpha_{HR}$ and $\beta_{HR}$) suitable to the high-resolution input image.

Also, according to an embodiment of the disclosure, the high-resolution model obtainer 620 does not only simply up-sample the low-resolution model, but also obtains the reliability weight regarding the low-resolution model, based on the similarity between the high-resolution input image and the low-resolution input image, and modifies the up-sampled low-resolution model by using the reliability weight, and thus may obtain the high-resolution model capable of more accurately outputting the high-resolution input image.

Figure 7:
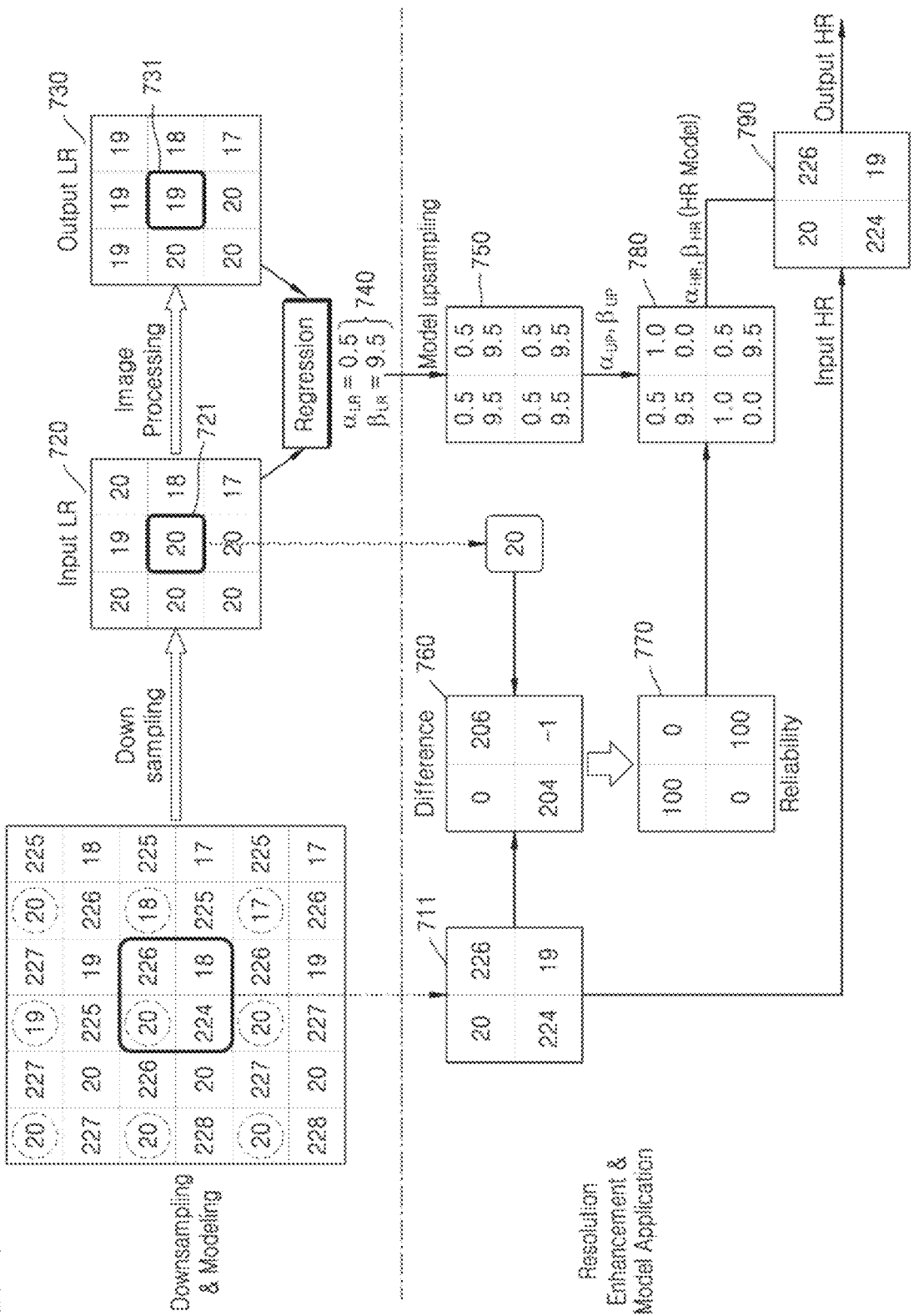
FIG. 7 is a diagram for describing a process by which an electronic device operates, by using a pixel value, according to an embodiment of the disclosure.

FIG. 7 is a diagram for describing a process by which an electronic device operates, by using a pixel value, according to an embodiment of the disclosure.

Referring to FIG. 7, the electronic device may obtain a low-resolution input image (Input LR) 720 by down-sampling a high-resolution input image (Input HR) 710.

For example, as shown in FIG. 7, the electronic device may down-sample 6×6 pixels of the high-resolution input image 710 to 3×3 pixels of the low-resolution input image 720. The electronic device may divide pixels included in the high-resolution input image 710 into groups of pixels having a size of 2×2, and perform down-sampling by selecting one pixel from each group. In FIG. 7, the electronic device performs the down-sampling by selecting a first pixel among the pixels included in the group, but an embodiment of the disclosure is not limited thereto.

According to an embodiment of the disclosure, the electronic device may obtain change amounts of pixels included in the group, select a pixel having a highest change amount, and perform the down-sampling on the selected pixel.

The electronic device may perform image quality processing on the low-resolution input image 720 to obtain a low-resolution output image (Output LR) 730 having a same size.

According to an embodiment of the disclosure, the electronic device may obtain a low-resolution model 740 indicating, as a linear regression model, a conversion relationship between the low-resolution input image 720 and the low-resolution output image 730. For example, the electronic device may obtain, as the low-resolution model 740, a conversion relationship between a first input pixel 721 in the low-resolution input image 720 and a first output pixel 731 in the low-resolution output image 730.

In FIG. 7, the electronic device may obtain the low-resolution model 740, in which a slope and a constant are respectively $\alpha_{LR}=0.5$ and $\beta_{LR}=9.5$, regarding the first input pixel 721.

According to an embodiment of the disclosure, the electronic device may up-sample the low-resolution model 740. The electronic device may obtain a model regarding four pixels down-sampled to the first input pixel 721, i.e., $\alpha_{UP}$ and $\beta_{UP}$ of the up-sampled model, by using $\alpha_{LR}$ and $\beta_{LR}$ of the low-resolution model 740 regarding the first input pixel 721.

FIG. 7 illustrates a case in which $\alpha LR$ and $\beta LR$ of the low-resolution model 740 for the first input pixel 721 are used as up-sampled models $\alpha UP$ and $\beta UP$ 750 for four pixels 711 in the high-resolution input image 710, where four pixels in the high-resolution input image 710 are down-sampled to the first input pixel 721. However, an embodiment of the disclosure is not limited thereto, and the electronic device may interpolate a pixel value of the first input pixel 721 by using pixel values adjacent to the first input pixel 721, and obtain $\alpha_{UP}$ and $\beta_{UP}$ of the up-sampled model 750 regarding the four pixels 711, by using the interpolated pixel value.

According to an embodiment of the disclosure, the electronic device may obtain a similarity between the high-resolution input image 710 and the low-resolution input image 720. For example, as shown in FIG. 7, the electronic device may obtain a pixel value difference 760 by comparing the pixels 711 before down-sampling and included in the high-resolution input image 710 with one pixel after down-sampling and included in the low-resolution input image 720.

According to an embodiment of the disclosure, the electronic device may obtain a reliability weight 770 by using the pixel value difference 760. For example, the electronic device may obtain 0 as reliability when a pixel value difference is equal to or greater than 100, and obtain 1 as reliability when a pixel value difference is less than 100.

According to an embodiment of the disclosure, the electronic device may use the reliability weight 770 obtained based on the pixel value difference 760 to modify $\alpha_{UP}$ and $\beta_{UP}$ of the up-sampled model 750 regarding the pixels 711 before the down-sampling. In other words, as shown in FIG. 7, the electronic device may obtain a high-resolution model 780, i.e., $y=\alpha_{HR} x+\beta_{HR}$, by changing a slope of a model to 1 when the reliability weight is 0 and not changing the model when the reliability weight is 100. $\alpha_{HR}$ and $\beta_{HR}$ of the high-resolution model 780 may denote AlphaHR and BetaHR, respectively.

The electronic device may obtain a high-resolution output image 790 from the high-resolution input image 710, by using the high-resolution model 780. For example, in FIG. 7, the electronic device may obtain the high-resolution output image 790 including four pixels by applying the high-resolution model 780 to the pixels 711 of a partial region in the high-resolution input image 710.

Figure 8:
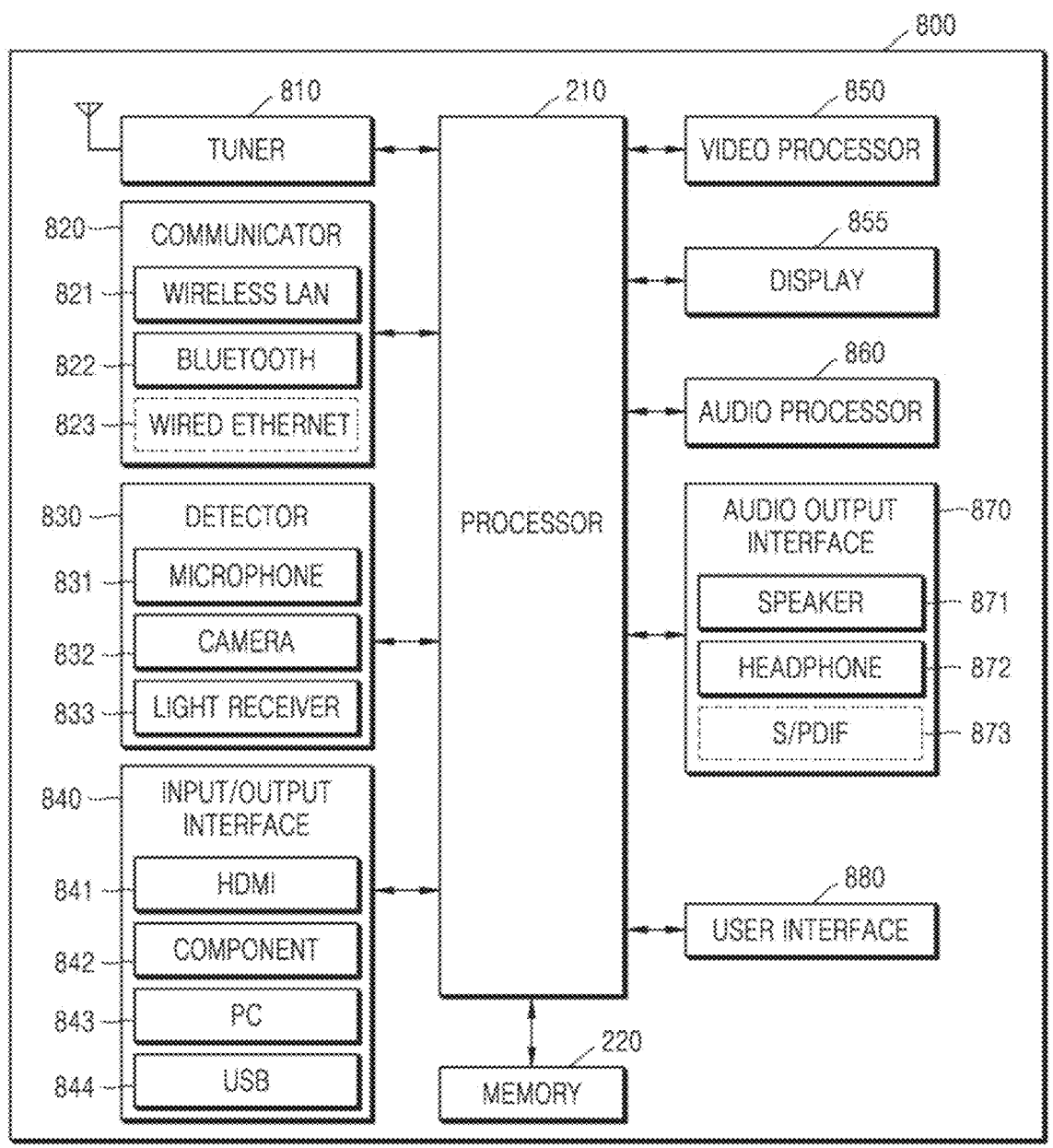
FIG. 8 is an internal block diagram of an electronic device according to an embodiment of the disclosure.

FIG. 8 is an internal block diagram of an electronic device 800 according to an embodiment of the disclosure.

The electronic device 800 of FIG. 8 may include the components of the electronic device 200 of FIG. 2.

Referring to FIG. 8, the electronic device 800 may include, in addition to the processor 210 and the memory 220, a tuner 810, a communicator 820, a detector 830, an input/output interface 840, a video processor 850, a display 855, an audio processor 860, an audio output interface 870, and a user interface 880.

The tuner 810 may tune and select only a frequency of a channel to be received by the electronic device 800 among many radio wave components by performing amplification, mixing, and resonance on broadcast content or the like received via wires or wirelessly. Content received through the tuner 810 is decoded and divided into audio, video, and/or additional information. The divided audio, video, and/or additional information may be stored in the memory 220 under control by the processor 210.

The communicator 820 may connect the electronic device 800 to an external device or server, according to control by the processor 210. The electronic device 800 may perform web browsing or download, from the external device or server through the communicator 820, a program or application required by the electronic device 800. Also, the communicator 820 may receive content from the external device.

The communicator 820 may include at least one of a wireless local area network (LAN) 821, Bluetooth 822, or wired Ethernet 823, according to performance and structure of the electronic device 800. The communicator 820 may receive a control signal via a control device (not shown), such as a remote controller, according to control by the processor 210. The control signal may be a Bluetooth type, a radio frequency (RF) signal type, or a Wi-Fi type. The communicator 820 may further include short-range communication other than the Bluetooth 822, such as near field communication (NFC) or Bluetooth low energy (BLE). According to an embodiment of the disclosure, the communicator 820 may transmit or receive a connection signal to or from the external device or the like, via short-range communication, such as the Bluetooth 822 or BLE.

The detector 830 detects voice of a user, an image of the user, or an interaction of the user, and may include a microphone 831, a camera 832, and a light receiver 833. The microphone 831 may receive voice uttered by the user, convert the received voice into an electric signal, and output the electric signal to the processor 210. The camera 832 includes a sensor (not shown) and a lens (not shown), and may capture an image on a screen. The light receiver 833 may receive an optical signal (including a control signal). The light receiver 833 may receive an optical signal corresponding to a user input (for example, touch, press, touch gesture, voice, or motion) from a control device (not shown), such as a remote controller or a mobile phone. A control signal may be extracted from the received optical signal, according to control by the processor 210.

The input/output interface 840 may receive additional information, such as video (for example, a moving image signal or a still image signal), audio (for example, a voice signal or a music signal), and metadata, from a device outside the electronic device 800, according to control by the processor 210. The input/output interface 840 may include one of a high-definition multimedia interface (HDMI) port 841, a component jack 842, a PC port 843, and a universal serial bus (USB) port 844. The input/output interface 840 may include a combination of the HDMI port 841, the component jack 842, the PC port 843, and the USB port 844.

The video processor 850 processes image data to be displayed by the display 855, and may perform various image processing operations, such as decoding, rendering, scaling, noise-filtering, frame rate conversion, and resolution conversion, on the image data.

According to an embodiment of the disclosure, the video processor 850 may perform functions of the signal processor 230 of FIG. 2. In other words, the video processor 850 may obtain a low-resolution input image by down-sampling a high-resolution input image, obtain a low-resolution output image by performing image quality processing on the low-resolution input image, obtain a low-resolution model from a conversion relationship between the low-resolution input image and the low-resolution output image, obtain a high-resolution model based on the low-resolution model, and obtain a high-resolution output image from the high-resolution input image by using the high-resolution model.

The display 855 may output, on a screen, content received from a broadcasting station or received from an external server or an external storage medium. The content is a medial signal and may include a video signal, an image, or a text signal. Also, the display 855 may display, on the screen, a video signal or image received via the HDMI port 841.

According to an embodiment of the disclosure, the display 855 may output the high-resolution output image obtained by the video processor 850 from the high-resolution input image by using the high-resolution model.

When the display 855 is configured as a touch screen, the display 855 may be used as an input device as well as an output device. Also, according to an implementation of the electronic device 800, the electronic device 800 may include two or more displays 855.

The audio processor 860 performs a process on audio data. The audio processor 860 may perform various processes, such as decoding, amplification, or noise filtering, on the audio data.

The audio output interface 870 may output audio included in content received through the tuner 810, audio input via the communicator 820 or input/output interface 840, or audio stored in the memory 220, according to control by the processor 210. The audio output interface 870 may include at least one of a speaker 871, a headphone output terminal 872, or a Sony/Philips digital interface (S/PDIF) terminal 873.

The user interface 880 may receive a user input for controlling the electronic device 800. The user interface 880 may include various types of user input device including a touch panel detecting a user's touch, a button receiving a push operation of the user, a wheel receiving a rotation operation of the user, a keyboard, a dome switch, a microphone for voice recognition, and a motion detection sensor sensing motion, but is not limited thereto. Also, when the electronic device 800 is manipulated by a remote controller (not shown), the user interface 880 may receive a control signal received from the remote controller.

Figure 9:
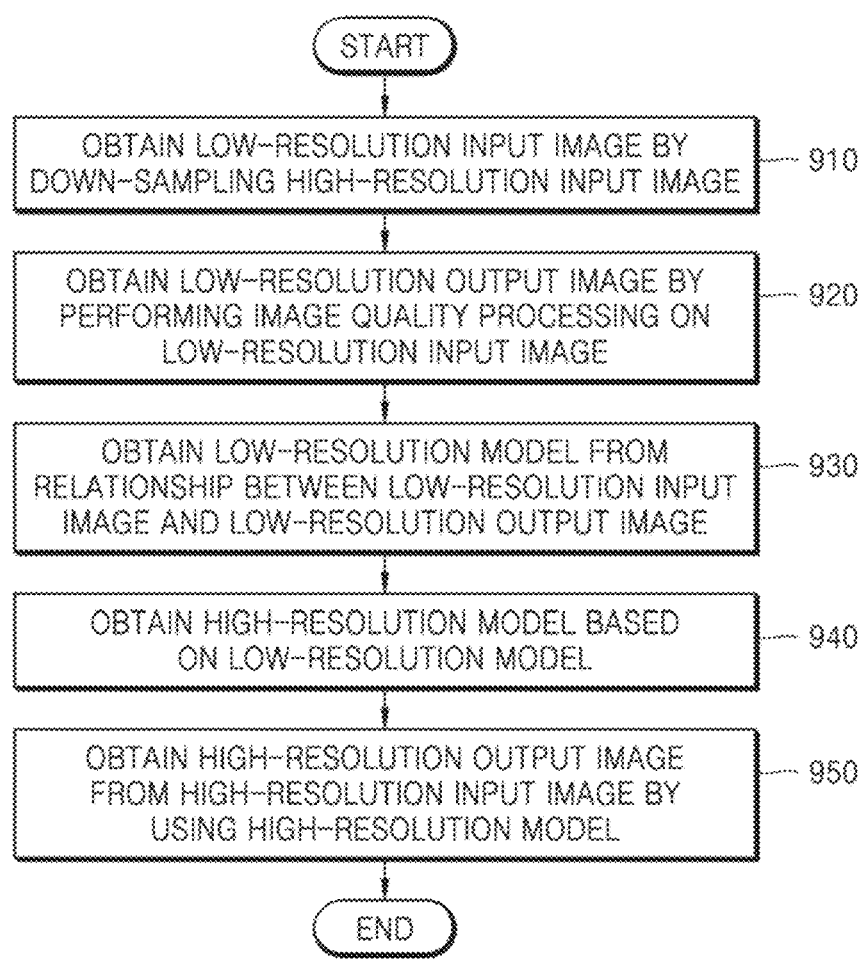
FIG. 9 is a flowchart of an operation method of an electronic device, according to an embodiment of the disclosure.

FIG. 9 is a flowchart of an operation method of an electronic device, according to an embodiment of the disclosure.

Referring to FIG. 9, the electronic device may obtain a low-resolution input image by down-sampling a high-resolution input image (operation 910).

The electronic device may down-sample the high-resolution input image via any one of various methods.

For example, the electronic device may divide the high-resolution input image into a plurality of pixel groups and down-sample the high-resolution input image by selecting a pixel of which a pixel value change amount in the pixel group is equal to or greater than a reference value, thereby obtaining the low-resolution input image.

According to an embodiment of the disclosure, the electronic device may obtain a low-resolution output image by performing image quality processing on the low-resolution input image (operation 920).

According to an embodiment of the disclosure, the electronic device may obtain a low-resolution model from a conversion relationship between the low-resolution input image and the low-resolution output image (operation 930).

According to an embodiment of the disclosure, the electronic device may obtain, as a linear regression model, a conversion relationship between an input pixel of the low-resolution input image and a corresponding output pixel of the low-resolution output image, with respect to each input pixel of the low-resolution input image.

According to an embodiment of the disclosure, the electronic device may obtain the linear regression model by using a conversion relationship between pixel values of a reference region including an input pixel and an adjacent pixel in the low-resolution input image and pixel values included in the low-resolution output image corresponding to the reference region.

According to an embodiment of the disclosure, the electronic device may obtain pixel value change amounts of pixels included in a standard region in the low-resolution input image, and adjust a size of the standard region according to the pixel value change amounts, thereby obtaining the reference region having the adjusted size.

According to an embodiment of the disclosure, the electronic device may obtain a high-resolution model based on the low-resolution model (operation 940).

The electronic device may obtain a high-resolution output image from the high-resolution input image, by using the high-resolution model (operation 950).

Figure 10:
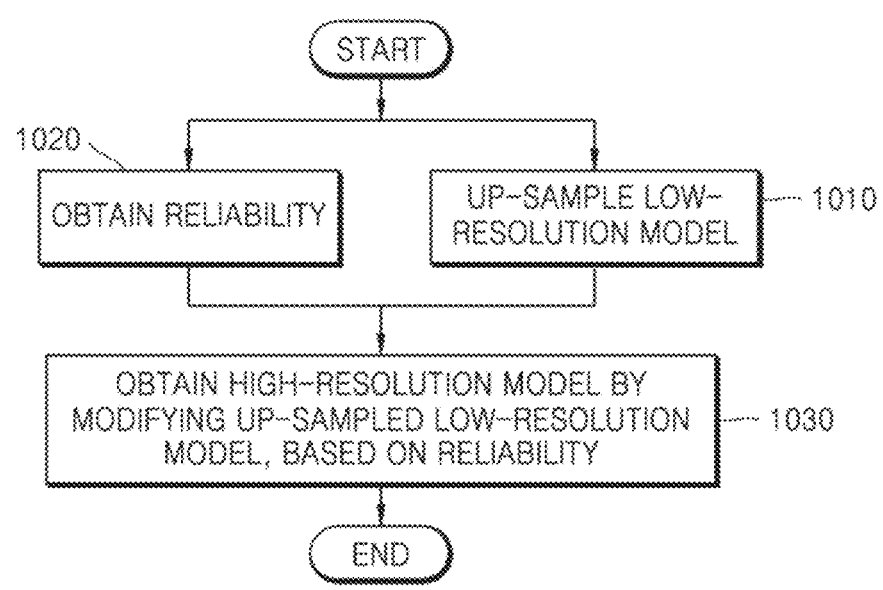
FIG. 10 is a flowchart of a process by which an electronic device obtains a high-resolution model, based on a low-resolution model, according to an embodiment of the disclosure.

FIG. 10 is a flowchart of a process by which an electronic device obtains a high-resolution model, based on a low-resolution model, according to an embodiment of the disclosure.

Referring to FIG. 10, the electronic device may up-sample the low-resolution model (operation 1010). The up-sampling of the low-resolution model may be obtaining of a slope and constant regarding a pixel suitable to resolution of a high-resolution input image, by using a slope and constant of the low-resolution model.

The electronic device may up-sample the low-resolution model to obtain a linear regression model regarding pixels of the high-resolution input image down-sampled to a first input pixel included in a low-resolution input image, by using a linear regression model regarding the first input pixel.

Alternatively, the electronic device may obtain the linear regression model regarding the pixels of the high-resolution input image down-sampled to the first input pixel, by interpolating the linear regression model regarding the first input pixel and a linear regression model regarding a second pixel adjacent to the first input pixel.

The electronic device may obtain reliability of the low-resolution model (operation 1020). The electronic device may obtain the reliability of the low-resolution model by using a difference between the high-resolution input image and the low-resolution input image. For example, the electronic device may obtain a difference value by comparing pixel values of pixels included in the high-resolution input image before down-sampling with a pixel value of a pixel included in the low-resolution input image after the down-sampling, and obtain the reliability according to the difference value of each of the pixels included in the high-resolution input image.

The electronic device may obtain a high-resolution model by modifying the up-sampled low-resolution model, based on the reliability of the low-resolution model (operation 1030).

The electronic device modifies at least one of the slope or the constant of the up-sampled low-resolution model, according to the reliability of the low-resolution model, such that, when reliability of a model is low, the pixel values of the high-resolution input image before the down-sampling are output as they are without using the model having the low reliability.

Figure 11:
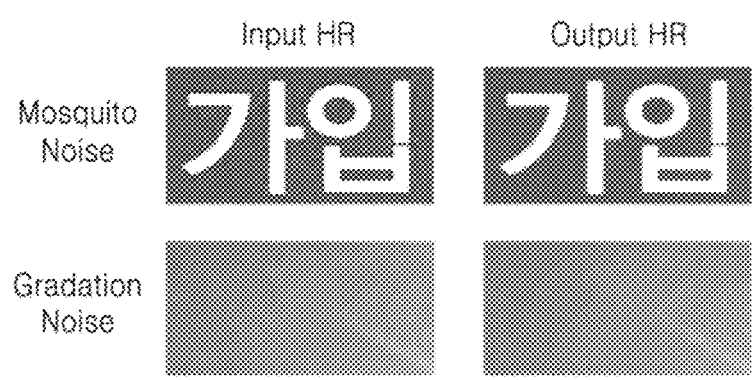
FIG. 11 is a diagram showing a high-resolution output image obtained, by an electronic device, from a high-resolution input image, according to an embodiment of the disclosure.

FIG. 11 is a diagram showing a high-resolution output image obtained by an electronic device from a high-resolution input image, according to an embodiment of the disclosure.

Referring to FIG. 11, the electronic device may obtain the high-resolution output image (Output HR) by applying a high-resolution model to the high-resolution input image (Input HR).

The high-resolution input image shown at the top of FIG. 11 indicates a case in which noise, such as a dot, is included in the high-resolution input image. The high-resolution input image shown at the bottom of FIG. 11 indicates a case in which the high-resolution input image includes a stepped portion.

According to an embodiment of the disclosure, the electronic device may down-sample the high-resolution input image and perform image quality processing on the down-sampled high-resolution input image. FIG. 11 illustrates a case in which the electronic device performs noise reduction among the image quality processing.

According to an embodiment of the disclosure, the electronic device may obtain a low-resolution model by modeling a conversion relationship between a low-resolution input image and a low-resolution output image by using a result of performing image quality processing on the low-resolution input image, and generate the high-resolution model by using the low-resolution model. The electronic device may up-sample the low-resolution model according to the number of pixels of the high-resolution input image, and modify the up-sampled low-resolution model, based on reliability of the low-resolution model, thereby obtaining the high-resolution model.

As shown in FIG. 11, it is identified that mosquito noise in a pixel form and a contour stepped portion in a flat region included in the high-resolution input images are all removed in the high-resolution output images obtained by the electronic device according to an embodiment of the disclosure. In other words, the electronic device removed noise of the high-resolution input image while preserving pixel-based details.

As such, according to an embodiment of the disclosure, the electronic device may up-sample the low-resolution model and use the low-resolution model by modifying the low-resolution model, such that edge sharpness included in the high-resolution input image is maintained while details are not lost. Also, the electronic device may be configured to satisfactorily perform not only image quality processing processed in units of wide surfaces, such as a contrast ratio and colors, but also image quality processing processed in units of pixels, such as noise reduction and sharpness enhancement.

The electronic device and the operation method thereof, according to some embodiments of the disclosure, may also be realized in a form of a recording medium including instructions executable by a computer, such as a program module executed by a computer. A computer-readable medium may be an arbitrary available medium accessible by a computer, and includes all volatile and non-volatile media and separable and non-separable media. Further, examples of the computer-readable medium may include a computer storage medium and a communication medium. Examples of the computer storage medium include all volatile and non-volatile media and separable and non-separable media, which have been implemented by an arbitrary method or technology, for storing information such as computer-readable instructions, data structures, program modules, and other data. The communication medium typically includes a computer-readable instruction, a data structure, a program module, other data of a modulated data signal, such as a carrier wave, or another transmission mechanism, and an example thereof includes an arbitrary information transmission medium.

Furthermore, in the specification, the term "unit" may be a hardware component such as a processor or circuit and/or a software component that is executed by a hardware component such as a processor.

Also, the electronic device and the operation method thereof, according to the embodiments of the disclosure, may be implemented as a computer program product including a computer-readable recording medium having recorded thereon a program for implementing the operation method of the electronic device, wherein the operation method includes: obtaining a low-resolution input image by down-sampling a high-resolution input image; obtaining a low-resolution output image by performing image quality processing on the low-resolution input image; obtaining a low-resolution model from a conversion relationship between the low-resolution input image and the low-resolution output image; obtaining a high-resolution model based on the low-resolution model; and obtaining a high-resolution output image from the high-resolution input image, by using the high-resolution model.

The above description is provided for illustration, and it will be understood by one of ordinary skill in the art that various changes in form and details may be readily made therein without departing from essential features and the scope of the disclosure as defined by the following claims. Accordingly, the above embodiments of the disclosure are examples only in all aspects and are not limited. For example, each component described as a single type may be implemented in a distributed manner, and similarly, components described as distributed may be implemented in a combined form.

What is claimed is:

1. A method of an electronic device, the method comprising:
    obtaining a low-resolution input image by down-sampling a high-resolution input image;
    obtaining a low-resolution output image by performing image quality processing on the low-resolution input image;
    obtaining a low-resolution model from a conversion relationship between the low-resolution input image prior to the image quality processing being performed and the low-resolution output image subsequent to the image quality processing being performed;
    performing up-sampling of the low-resolution model;
    obtaining a high-resolution model by modifying the up-sampled low-resolution model, based on a difference between the high-resolution input image and the low-resolution input image; and
    obtaining a high-resolution output image from the high-resolution input image, by applying the high-resolution model to the high-resolution input image,
    wherein the down-sampling of the high-resolution input image comprises dividing the high-resolution input image into a plurality of pixel groups and selecting a pixel to be sampled independently for each of the plurality of pixel groups.

2. The method of claim 1, wherein the down-sampling of the high-resolution input image comprises selecting a pixel having a pixel value change amount in the plurality of pixel groups equal to or greater than a reference value, for each of the plurality of pixel groups.

3. The method of claim 1, wherein the obtaining of the low-resolution model comprises obtaining, as the low-resolution model, a linear regression model indicating a conversion relationship between a pixel value of an input pixel of the low-resolution input image and a pixel value of an output pixel of the low-resolution output image, the output pixel corresponding to the input pixel.

4. The method of claim 3, wherein the linear regression model is obtained by using a conversion relationship between pixel values of a reference region including the input pixel and pixel values of a region corresponding to the reference region and including the output pixel.

5. The method of claim 4, wherein the obtaining of the low-resolution model further comprises:
    obtaining pixel value change amounts of pixels included in a standard region in the low-resolution input image, the standard region including the input pixel; and
    obtaining the reference region with an adjusted size by adjusting a size of the standard region according to the pixel value change amounts.

6. The method of claim 3, wherein the up-sampling of the low-resolution model comprises obtaining a linear regression model regarding pixels of the high-resolution input image down-sampled to the input pixel by using the linear regression model regarding the input pixel.

7. The method of claim 3, wherein the input pixel is a first input pixel and the up-sampling of the low-resolution model comprises:
    obtaining a linear regression model regarding pixels of the high-resolution input image down-sampled to the first input pixel, by interpolating the linear regression model regarding the first input pixel and a linear regression model regarding a second input pixel adjacent to the first input pixel.

8. The method of claim 1, wherein the obtaining of the high-resolution model comprises:
    obtaining a reliability weight for each pixel of the high-resolution input image, based on a pixel value difference between the high-resolution input image and the low-resolution input image; and
    obtaining the high-resolution model by applying the reliability weight to the up-sampled low-resolution model.

9. The method of claim 8, wherein the reliability weight is obtained based on a pixel value difference between a certain region of the high-resolution input image and the low-resolution input image obtained by being down-sampled from the certain region.

10. An electronic device comprising:
    a signal processor;
    a memory storing one or more instructions; and
    a processor configured to execute the one or more instructions stored in the memory to control the signal processor,
    wherein the signal processor is configured to, according to control by the processor:
        obtain a low-resolution input image by down-sampling a high-resolution input image;
        obtain a low-resolution output image by performing image quality processing on the low-resolution input image;
        obtain a low-resolution model from a conversion relationship between the low-resolution input image prior to the image quality processing being performed and the low-resolution output image subsequent to the image quality processing being performed;
        perform up-sampling of the low-resolution model;
        obtain a high-resolution model by modifying the up-sampled low-resolution model, based on a difference between the high-resolution input image and the low-resolution input image; and
        obtain a high-resolution output image from the high-resolution input image, by applying the high-resolution model to the high-resolution input image,
    wherein the signal processor is further configured to divide the high-resolution input image into a plurality of pixel groups and down-sample the high-resolution input image by selecting a pixel to be sampled independently for each of the plurality of pixel groups.

11. The electronic device of claim 10, wherein the signal processor is further configured to down-sample the high-resolution input image by selecting a pixel having a pixel value change amount in the plurality of pixel groups equal to or greater than a reference value, for each of the plurality of pixel groups.

12. The electronic device of claim 10, wherein the signal processor is further configured to obtain as the low-resolution model, a linear regression model indicating a conversion relationship between a pixel value of an input pixel of the low-resolution input image and a pixel value of an output pixel of the low-resolution output image, the output pixel corresponding to the input pixel.

13. The electronic device of claim 12, wherein the signal processor is further configured to obtain the linear regression model by using a conversion relationship between pixel values of a reference region including the input pixel and pixel values of a region corresponding to the reference region and including the output pixel.

14. The electronic device of claim 13, wherein the signal processor is further configured to:
  obtain pixel value change amounts of pixels included in a standard region in the low-resolution input image, the standard region including the input pixel; and
  obtain the reference region with an adjusted size by adjusting a size of the standard region according to the pixel value change amounts.

15. The electronic device of claim 12, wherein the signal processor is further configured to up-sampling the low-resolution model by obtaining a linear regression model regarding pixels of the high-resolution input image down-sampled to the input pixel by using the linear regression model regarding the input pixel.

16. The electronic device of claim 12, wherein the input pixel is a first input pixel and the signal processor is further configured to:
  obtain a linear regression model regarding pixels of the high-resolution input image down-sampled to the first input pixel, by interpolating the linear regression model regarding the first input pixel and a linear regression model regarding a second input pixel adjacent to the first input pixel.

17. The electronic device of claim 10, wherein the signal processor is further configured to obtain a reliability weight for each pixel of a certain region of the high-resolution input image, based on a pixel value difference between the certain region and the low-resolution input image obtained by being down-sampled from the certain region, and obtain the high-resolution model by applying the reliability weight to the up-sampled low-resolution model.

18. A non-transitory computer-readable recording medium having recorded thereon a program for implementing an operation of an electronic device, the operation comprising:
  obtaining a low-resolution input image by down-sampling a high-resolution input image;
  obtaining a low-resolution output image by performing image quality processing on the low-resolution input image;
  obtaining a low-resolution model from a conversion relationship between the low-resolution input image prior to the image quality processing being performed and the low-resolution output image subsequent to the image quality processing being performed;
  performing up-sampling of the low-resolution model;
  obtaining a high-resolution model by modifying the up-sampled low-resolution model, based on a difference between the high-resolution input image and the low-resolution input image; and
  obtaining a high-resolution output image from the high-resolution input image by applying the high-resolution model to the high-resolution input image,
  wherein the down-sampling of the high-resolution input image comprises dividing the high-resolution input image into a plurality of pixel groups and selecting a pixel to be sampled independently for each of the plurality of pixel groups.

\* \* \* \* \*